E. E. PORTER.
FRICTION CLUTCH.
APPLICATION FILED OCT. 11, 1915.
1,198,052.
Patented Sept. 12, 1916.
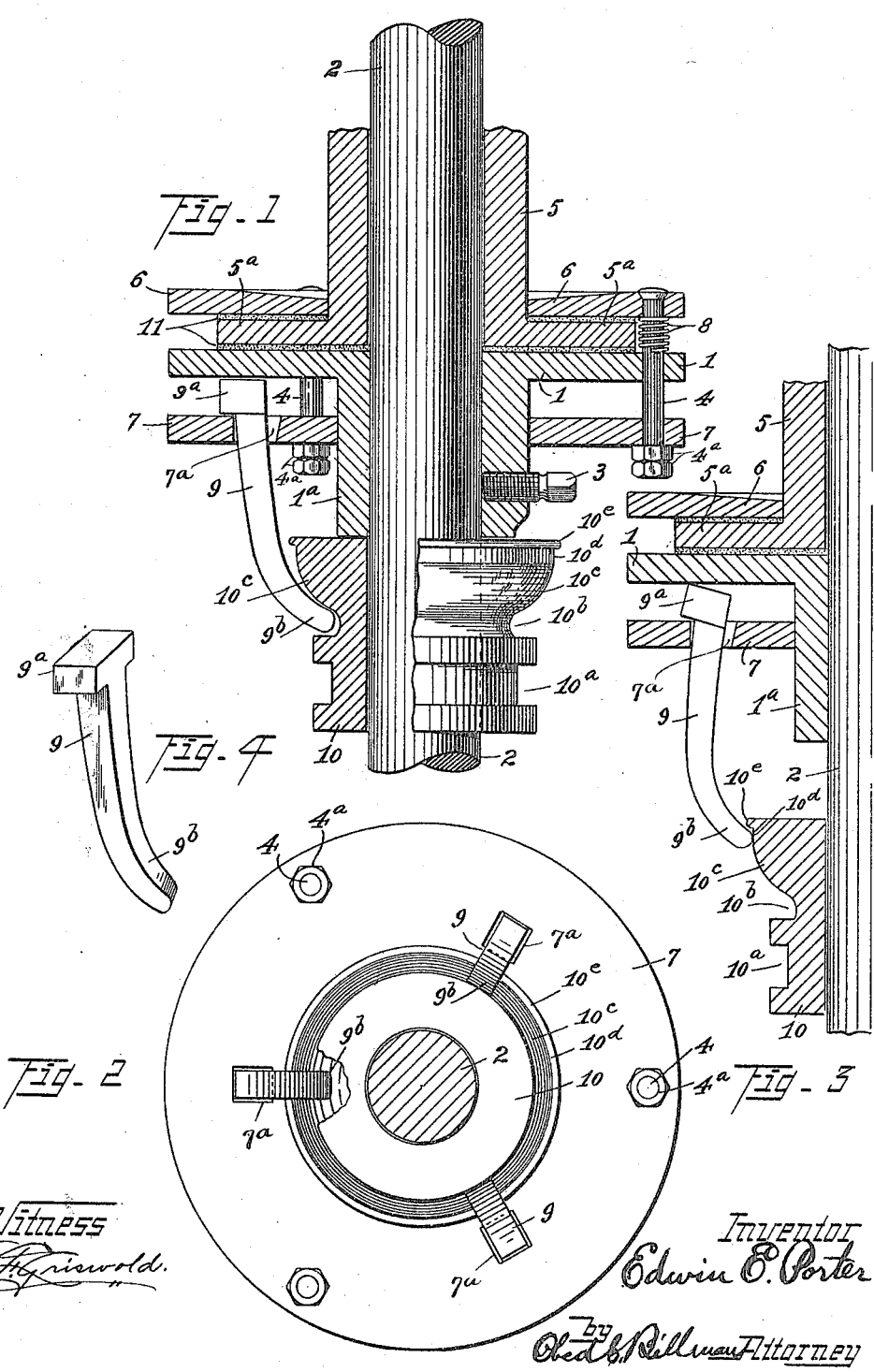

UNITED STATES PATENT OFFICE.

EDWIN E. PORTER, OF WOOSTER, OHIO.

FRICTION-CLUTCH.

1,198,052. Specification of Letters Patent. Patented Sept. 12, 1916.

Application filed October 11, 1915. Serial No. 55,176.

*To all whom it may concern:*

Be it known that I, EDWIN E. PORTER, a citizen of the United States, residing at Wooster, in the county of Wayne and State of Ohio, have invented certain new and useful Improvements in Friction-Clutches, of which the following is a specification.

My invention relates to improvements in friction clutches, the present form or embodiment relating more particularly to that class or type known as "multiple disk friction clutches."

The primary object of the invention is to provide a generally improved friction clutch of exceedingly simple, cheap, and efficient construction, which may be readily applied and used in connection with either a clutch pulley or a clutch sleeve member upon a driving shaft.

A further object is to improve and simplify the construction and arrangement of the friction disks as well as to provide a large frictional surface and provide improved means for mounting and actuating the various parts.

A still further object is the provision of improved longitudinally movable disks carried by the fixed clutch member and movable relative to each other, one of said disks being provided with improved clutch actuating or shifting levers mounted and actuated in an improved and simplified manner and coöperating with the various parts whereby to increase the general efficiency of the clutch as a whole.

A still further object is the provision of an improved pull shifting sleeve particularly designed and adapted to coöperate with the outwardly and inwardly inclined free ends of the improved clutch shifting levers and embodying an annular groove and conical or inclined head conforming to said curved or inwardly inclined free ends of said shifting levers and adapted not only to expand and shift such levers when moved outwardly from the lever carrying disk or member, but provided with an annular lever stop flange and rest, holding the parts in shifted or clutched position.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a central longitudinal sectional view of the improved friction clutch embodying a clutch sleeve, the parts being shown in clutch released position. Fig. 2, an end view of the same from the shifting sleeve side thereof. Fig. 3, a detached fragmentary longitudinal sectional view showing the parts in clutched or shifted position with the outer or free ends of the improved shifting levers locked and resting upon the lever stop flange and rest of the improved shifting sleeve. Fig. 4, a perspective view of one of the improved clutch shifting levers detached.

Similar numerals of reference designate like parts throughout all the figures of the drawings.

The improved friction clutch comprises a fixed clutch member or disk 1, keyed or otherwise suitably secured upon a driving shaft 2, in the present instance, by means of a set screw 3. The fixed clutch 1, is provided with a sleeve or hub portion 1$^a$, and is provided about its outer periphery with a plurality of openings, preferably three in number, adapted to slidably receive and carry a plurality of guide or disk carrying bolts 4, the latter being adapted to carry the improved clutch actuating and supporting disks or members hereinafter described.

The loose clutch member 5, in the present instance, in the form of a clutch sleeve, is provided with a friction bearing or disk head 5$^a$.

The improved clutch actuating or clamping members, in the present instance, comprise a pair of longitudinally movable disks 6, and 7, mounted upon the guide bolts 4, the disk 6, being spring resisted and normally held away from contact with the friction bearing or disk head 5$^a$, by means of coiled expansion springs 8, surrounding the bolts 4, and interposed between the disk 6, and the fixed member or disk 1. The disk or member 7, is loosely mounted upon the guide bolts 4, and upon the sleeve portion 1$^a$, of the fixed member and is adapted to be adjusted through the medium of the adjusting nuts 4$^a$, of the guide bolts 4.

The bearing disk 7, forms a support for the improved clutch shifting or actuating levers 9, the latter preferably comprising angular shaped cam heads 9$^a$, interposed between the lever supporting member 7, and the opposing or adjacent portion of the fixed clutch member 1, said clutch shifting or actuating levers 9, being loosely mounted in suitable lever bearing openings 7ª, and terminating in outwardly and inwardly inclined free ends 9ᵇ, converging or extending toward each other and toward the driving shaft 2.

As a means of actuating the levers 9, as well as holding the same in their respective shifted and unshifted positions, an improved shifting sleeve 10, is provided upon the shaft 2, said sleeve being provided with a suitable groove 10ª, for the reception of a suitable shifting lever or wheel (not shown) or other suitable actuating device, and it will also be observed that the improved shifting sleeve embodies an annular groove or recess 10ᵇ, and conical or inwardly and outwardly flaring bearing heads 10ᶜ, said groove 10ᵇ, and conical bearing head 10ᶜ, conforming substantially to the contour of the curved or inclined free ends of the levers 9, to normally receive and form a seat for the same when in their unshifted positions, as shown most clearly in Fig. 1 of the drawings, and as a means of forming a stop to terminate the outward movement of the shifting sleeve 10, as well as to lock the parts in their shifted positions, the conical bearing head 10ª, terminates at its base in an annular flattened base or seat portion 10ᵈ, and an annular stop flange 10ᵉ, adapted to limit and stop the parts mentioned, as clearly illustrated in Fig. 3 of the drawings.

Suitable friction disks 11, of suitable material such as wood fiber, or the like, may be interposed between the fixed and loose clutch members 1 and 5, respectively, and the bearing disk 6.

From the foregoing description, taken in connection with the accompanying drawings, the operation and advantages of my invention will be readily understood.

Having thus described one of the embodiments of my invention, what I claim and desire to secure by Letters Patent, is,—

1. A clutch pull shifting sleeve for friction clutches, having an annular groove adapted to receive and contain the free ends of the shifting levers when the latter are unshifted and provided with a conical shaped bearing head terminating in an annular seat portion adapted to form a seat for and lock the free ends of the shifting levers when the latter and said sleeve are in their shifted positions.

2. A friction clutch, comprising a fixed clutch member and a loose clutch member, a lever carrying disk member and a connected clamping disk carried by said fixed clutch member and longitudinally movable in clamping relation to said loose clutch member, clutch shifting levers carried by said disk member and having angularly shaped cam heads interposed between the latter and said fixed clutch member, and a shifting sleeve adapted to move said shifting levers to and from their clutch shifting and releasing position.

3. In a friction clutch, the combination with a driving shaft provided with fixed and loose clutch members one of which is provided with guide bolts having a spring resisted axially movable clamping disk; of an axially movable bearing disk adjustably mounted on said bolts in coöperative clamping relation to said clamping disk and clutch members and provided with angular shaped openings midway between said guide bolts, said axially movable clamping and bearing disks engaging on opposite sides of one of said clutch members, and angular shaped clutch shifting levers loosely mounted in said openings and provided with angular radially extending expansion heads on the inner side of said bearing disk in coöperative expansive relation to the latter and one of said clutch members.

4. In a friction clutch, a combination with fixed and loose clutch members, a clamping disk on one side of one of said clutch members, an axially movable bearing disk on the other side of said members and provided with a plurality of angularly shaped openings, and angularly shaped clutch shifting levers loosely mounted in said openings and provided with angularly shaped expansion heads interposed between the inner side of said bearing disk and said clutch members, said shifting levers extending inwardly toward each other on the outer sides of said disk; of a pull shifting sleeve having an annular groove receiving the free ends of said levers and provided with a conical shaped lever shifting and expanding head terminating in lever stop and seat forming portions adapted to lock said levers and sleeve in their clutch engaging shifted positions.

5. In a friction clutch, a driving shaft, fixed and loose clutch members mounted thereon, guide bolts mounted in one of said clutch members and provided with coiled expansion springs, longitudinally movable friction and lever supporting disks mounted on said guide bolts adapted to be moved out of clutching relation to said clutch members by said expansion springs, said lever supporting disk being provided with lever openings intermediate said guide bolts and the latter being adjustably connected to said friction disk, shifting levers loosely mounted in said openings and provided with angular shaped cam heads interposed between said lever supporting disk and said fixed clutch member, and a shifting sleeve mounted on said driving shaft and operatively connected to said shifting levers.

6. In a friction clutch, the combination with fixed and loose clutch members one of which is provided with guide bolts, and a bearing disk adjustably mounted on said bolts and provided with angularly shaped lever receiving openings midway between the latter; of clutch shifting levers mounted in said openings and provided with angular shaped expansion heads on the inner side of said bearing disk and adjacent said fixed clutch member whereby upon actuating said levers said loose clutch member is drawn into clamping relation with said fixed clutch member, said levers being provided with inwardly inclined free ends projecting from the outer side of said bearing disk, and a pull shift sleeve having a flaring or conical shaped bearing head interposed between the free ends of said levers and terminating in annular stop and seat portions adapted to stop and lock said levers and sleeve in clutch shifted positions.

7. A friction clutch, comprising a driving shaft, fixed and loose clutch members mounted thereon, adjustable guide bolts mounted on one of said clutch members and provided with a clamping disk and a lever supporting disk, expansion springs mounted on said guide bolts normally holding said friction disk out of clamping engagement with one of said clutch members, clutch shifting levers mounted in said lever supporting disk and provided with cam shaped heads between said disk and said fixed clutch adapted to move said loose clutch member and said friction disk against the resistance of said springs whereby said clutch members are brought into clutched relation with each other, and a shifting sleeve adapted to actuate said clutch shifting levers.

8. A friction clutch, comprising a fixed clutch disk, a loose clutch disk, a pair of longitudinally movable disks carried by said fixed clutch disk on opposite sides of said fixed and movable clutch disks, one of said disks being a friction disk and the other carrying shifting levers in contact with said fixed clutch disk, said shifting levers having outwardly and inwardly inclined free ends, and a shifting sleeve having an annular groove and conical shaped head normally receiving and forming a seat for said inwardly inclined free ends of said levers and adapted to expand and shift the latter when moved outwardly from said lever carrying disk, said conical shaped head of said shifting sleeve terminating at one side in a lever stop flange and rest for stopping and locking said levers and sleeve when shifted to clutched positions.

In testimony whereof I have affixed my signature in the presence of two witnesses.

EDWIN E. PORTER.

Witnesses:
E. S. LANDES,
M. B. BRYSON.

Copies of this patent may be obtained for five cents each, by addressing the "Commissioner of Patents, Washington, D. C."